United States Patent [19]

Yoshida

[11] Patent Number: 5,475,283
[45] Date of Patent: Dec. 12, 1995

[54] DEMAGNETIZER FOR DISPLAY UNIT

[75] Inventor: Shinichi Yoshida, Tokyo, Japan

[73] Assignee: Sony Corporation, Tokyo, Japan

[21] Appl. No.: 190,758

[22] Filed: Feb. 2, 1994

[30] Foreign Application Priority Data

Feb. 10, 1993 [JP] Japan .................................. 5-022907

[51] Int. Cl.⁶ ..................................................... H04N 9/29
[52] U.S. Cl. ............................................................. 315/8
[58] Field of Search ................................. 315/8; 361/150

[56] References Cited

U.S. PATENT DOCUMENTS 4,636,911  1/1987  Truskalo ........................................ 315/8
5,148,083  9/1992  Hatada .......................................... 315/8

Primary Examiner—Robert J. Pascal
Assistant Examiner—Michael Shingleton
Attorney, Agent, or Firm—Peter C. Toto; Jerry A. Miller

[57] ABSTRACT

A demagnetizer for display unit which allows to reliably demagnetize without bothering the user thereof. A start pulse a1 is sent out from a timer 21 to an activating pulse generating circuit 22 in every predetermined time t1 to sent out an activating pulse b. Receiving the activating pulse b, a demagnetizing current generating circuit 23 sends out a demagnetizing current I to a degauss coil 1 to demagnetize a magnetized shadow mask (or aperture grille). The activating pulse b is also supplied to a reset pulse generating circuit 24 to send out a reset pulse c to the timer 21. Thereby a counting of the timer 21 is reset and the start pulse a1 is sent out as the predetermined time t1 elapses. This demagnetizer allows to carry out the demagnetizing action without bothering the user.

6 Claims, 10 Drawing Sheets

System of Demagnetizing Current Generating Circuit 23

Signal Waveform of Demagnetizer 20A

System of Demagnetizer 20B of Second Invention

System of Demagnetizer 20C of Third Invention

System of Demagnetizer 20D of Fourth Invention

Signal Waveform of Demagnetizer 20E

System of Related Art Demagnetizer (Prior Art)

DEMAGNETIZER FOR DISPLAY UNIT

BACKGROUND OF THE INVENTION

1. Field of the Invention

The present invention relates to a demagnetizer for display unit suitably applied to a TV receiver and TV monitor, etc.

2. Description of the Related Art

A shadow mask or aperture grille for selecting colors is provided within a color cathode-ray tube of a TV receiver and TV monitor for example and a thin steel plate is used for that. Due to that, when the TV receiver or TV monitor is carried over by airplane or the like to use at a remote place distant from the manufacturing site thereof, the shadow mask and the like is often magnetized by an external magnetic field such as terrestrial magnetism. Then an orbit of electron beam is disturbed around the shadow mask in the tube, hence degrading its color purity. In order to prevent such problem, such a demagnetizer as shown in FIG. 12 is incorporated in the TV receiver or TV monitor. By the way, although the following explanation will be made exemplifying the shadow mask, the same applies to the aperture grille as well.

A degauss coil 1 is attached to the shadow mask of the TV monitor, for example, in the demagnetizer shown in FIG. 12. When a power switch 2 of the TV monitor is turned on, a demagnetizing current I which attenuates in accordance with the lapse of time is flown in the degauss coil 1 via a thermistor 3 of positive characteristic. Thereby, a flux density generated from the degauss coil 1 is converged to the origin and the residual magnetism on the shadow mask is removed (as described in U.S. Pat. No. 5,148,083 for example).

PROBLEMS TO BE SOLVED BY THE INVENTION

Normally the magnetism is removed only when the power switch 2 is turned on in related art magnetizers. It is because the demagnetization is carried out when the resistance rapidly increases and the current attenuates when the temperature of the positive characteristic thermistor 3 rises due to its self-heating phenomenon after several seconds from when the power is turned on in which a large current flows in the degauss coil 1 because the positive characteristic thermistor 3 is cool and its resistance is small.

Due to that, when the shadow mask is magnetized and the picture quality is degraded during when the TV monitor or the like is used, it has been necessary to demagnetize it by turn off the power switch 2 once and turning on again after cooling the positive characteristic thermistor 3, bothering the user thereof.

In order to prevent such problem, a manual demagnetizing switch (not shown), beside the power switch 2, is provided in some demagnetizers. Such demagnetizer allows to demagnetize the shadow mask just by turning on the demagnetizing switch because the positive characteristic thermistor 3 is cooled down even when the TV monitor is used if the manual switch is turned off after demagnetizing the shadow mask. However, the demagnetizing switch has to be still manipulated manually, bothering the user (as described in U.S. Pat. No. 5,148,083 for example).

Accordingly, it is an object of the present invention to solve the aforementioned problems by providing a demagnetizer for display unit which allows to demagnetize reliably without bothering the user.

SUMMARY OF THE INVENTION

Means for Solving the Problems

In order to solve the aforementioned problems, according to a first embodiment of the present invention, a demagnetizer for display unit having a cathode-ray tube for displaying color pictures comprises a degauss coil for demagnetizing a magnetized shadow mask or aperture grille of the cathode-ray tube, demagnetizing current generating means for supplying a demagnetizing current to the degauss coil, activating pulse generating means for generating an activating pulse for activating the demagnetizing current generating means, a timer for setting intervals for generating the activating pulse and timer reset means for resetting the timer when the activating pulse is generated.

According to a second embodiment of the present invention, a demagnetizer for display unit having a cathode-ray tube for displaying color pictures comprises a degauss coil for demagnetizing a magnetized shadow mask or aperture grille of the cathode-ray tube, demagnetizing current generating means for supplying a demagnetizing current to the degauss coil, activating pulse generating means for generating an activating pulse for activating the demagnetizing current generating means, a timer for setting intervals for generating the activating pulse, timer reset means for resetting the timer when the activating pulse is generated and a switch for activating the activating pulse generating means.

According to a third embodiment of the present invention, a demagnetizer for display unit having a cathode-ray tube for displaying color pictures comprises a degauss coil for demagnetizing a magnetized shadow mask or aperture grille of the cathode-ray tube, demagnetizing current generating means for supplying a demagnetizing current to the degauss coil, activating pulse generating means for generating an activating pulse for activating the demagnetizing current generating means, a timer for setting intervals for generating the activating pulse, timer reset means for resetting the timer when the activating pulse is generated and video signal detecting means for detecting video signals supplied to the display unit and for generating a stop pulse for stopping the activating pulse generating means when the video signals are supplied.

According to a fourth embodiment of the present invention, a demagnetizer for display unit having a cathode-ray tube for displaying color pictures comprises a degauss coil for demagnetizing a magnetized shadow mask or aperture grille of the cathode-ray tube, demagnetizing current generating means for supplying a demagnetizing current to the degauss coil, activating pulse generating means for generating an activating pulse for activating the demagnetizing current generating means, a switch for activating the activating pulse generating means and video signal detecting means for detecting video signals supplied to the display unit and for generating a stop pulse for stopping the activating pulse generating means when the video signals are supplied.

According to a fifth embodiment of the present invention, a demagnetizer for display unit having a cathode-ray tube for displaying color pictures comprises a degauss coil for demagnetizing a magnetized shadow mask or aperture grille of the cathode-ray tube, demagnetizing current generating means for supplying a demagnetizing current to the degauss coil, activating pulse generating means for generating an activating pulse for activating the demagnetizing current generating means, a timer for setting intervals for generating the activating pulse, timer reset means for resetting the timer when the activating pulse is generated, a switch for activating the activating pulse generating means and video signal detecting means for detecting video signals supplied to the display unit and for generating a stop pulse for stopping the activating pulse generating means when the video signals are supplied.

OPERATIONS

In the embodiment shown in FIG. 1, a start pulse a1 (see FIG. 3) is sent out from the timer 21 in every predetermined time t1 to an activating pulse generating circuit 22 to send out an activating pulse b. Receiving the activating pulse b, a demagnetizing current generating circuit 23 sends out a demagnetizing current I to be supplied to a degauss coil 1 to demagnetize the shadow mask (or aperture grille).

The activating pulse b is also supplied to a reset pulse generating circuit 24 to send out a reset pulse c to be supplied to the timer 21. Thereby a counting of the timer 21 is reset and the start pulse a1 is sent out as the predetermined time t1 elapses.

In the embodiment shown in FIG. 4, when a manual demagnetizing switch 25 is pressed, a start pulse a2 (see FIG. 5) is sent out to the activating pulse generating circuit 22 to send out the activating pulse b. The demagnetizing action is carried out and the timer 21 is reset thereafter by the same processing as described above. Accordingly, the demagnetizing action will not be started within a shorter period of time than the predetermined time t1 after the manual demagnetization, i.e. before the positive characteristic thermistor 3 is fully cooled down, so that the demagnetizing action is effectively carried out.

In the embodiment shown in FIG. 6, when a synchronous signal detecting circuit 26 detects a horizontal synchronous signal (SH) or vertical synchronous signal (SV), it sends out a stop pulse d (see FIG. 7) to the activating pulse generating circuit 22. At this time, the activating pulse b is not generated even if the start pulse a1 is sent out from the timer 21, so that no demagnetizing action is carried out. Because the timer 21 is not reset at this time, the start pulse a1 is sent out continuously. Then when the stop pulse d turns low, the activating pulse b is sent out and the demagnetizing action is carried out.

In the embodiment shown in FIG. 8, the start pulse a2 (see FIG. 9) is sent out when the manual demagnetizing switch 25 is pressed and it causes the activating pulse generating circuit 22 to send out the activating pulse b. The demagnetizing action is then carried out. When the synchronous signal SH (SV) is detected by the synchronous signal detecting circuit 26, the stop pulse d is generated. The demagnetizing action will not be carried out even if the start pulse a2 is generated during this period t4.

EFFECT OF THE INVENTION

That is, although the demagnetizing action is carried out by the start pulse a1 sent out from the timer 21 in every predetermined time t1 or by the start pulse a2 sent out from the manual demagnetizing switch 25, it will not be carried out during the period t4 when the stop pulse d is sent out from the synchronous signal detecting circuit 26 even if the start pulses a1 and a2 are sent out.

As described above, the first embodiment is adapted to demagnetize the shadow mask automatically in every certain period of time set by the timer. Accordingly, if the present embodiment is applied to a TV monitor for example, because the demagnetization is carried out automatically even when the power is not turn on, the degradation of the picture quality can be prevented without bothering the user even if the TV monitor is carried over to a remote place by airplane.

The second embodiment is adapted to be able to demagnetize the shadow mask any time by the manual demagnetizing switch while demagnetizing automatically in every certain period of time set by the timer. Therefore, when the picture quality is degraded due to the magnetization while watching the screen, it can be demagnetized immediately by pressing the manual demagnetizing switch.

The third embodiment is adapted to stop the demagnetizing action during when the video signal is input while demagnetizing automatically in every certain period of time set by the timer. Therefore, it allows to prevent the screen from being disturbed by the demagnetizing action while watching an important picture.

The fourth embodiment is adapted not to carry out the demagnetizing action during when the video signal is input while allowing to demagnetize any time by the manual demagnetizing switch. Therefore, it allows to demagnetize the shadow mask even when the power is not turned on and to prevent the screen from being disturbed by the demagnetizing action while watching an important picture.

The fifth embodiment is adapted to be able to demagnetize any time by the manual demagnetizing switch and to stop the demagnetizing action during when the video signal is input while allowing to demagnetize automatically in every certain period of time set by the timer. Therefore, it allows to demagnetize without bothering the user and to demagnetize any time as necessary. Furthermore, it allows the screen from being disturbed by the demagnetizing action while watching an important picture.

The above and other objects and features of the present invention will be apparent in detail from the following description which will be given with reference to the illustrative accompanying drawings wherein like parts in each of the several figures are identified by the same reference character.

DETAILED DESCRIPTION OF PREFERRED EMBODIMENTS

Figure 1:
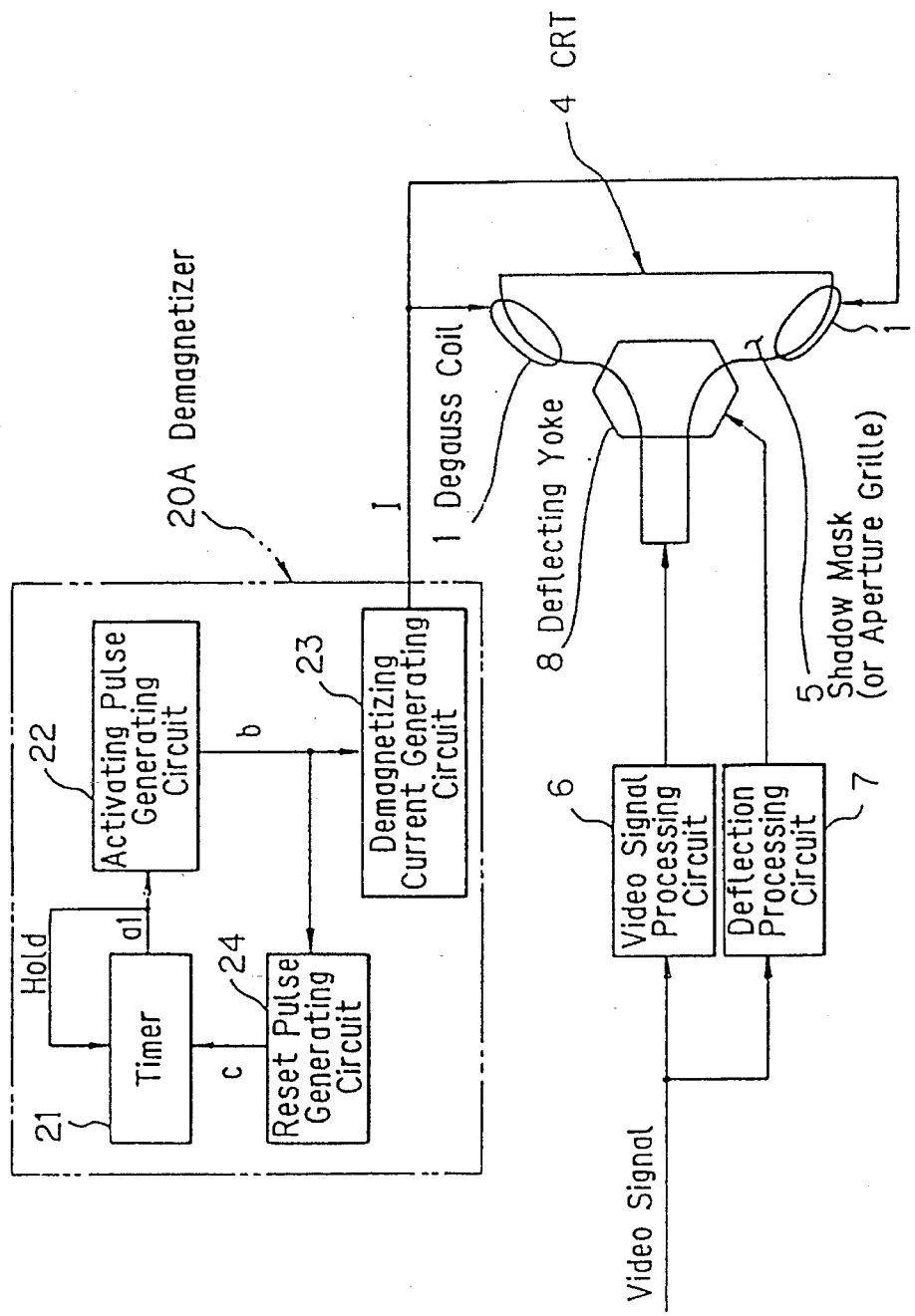
FIG. 1 is a system diagram of a TV monitor to which a demagnetizer for display unit of a first embodiment is applied.

Referring now to the drawings, a demagnetizer for display unit of the present invention will be described in detail for a case when it is applied to a TV monitor. While the TV monitor in which a shadow mask is used will be explained in the present embodiment, the same will apply to a case when an aperture grille is used.

FIG. 1 is a system diagram of a TV monitor 10 to which a demagnetizer 20A for display unit of a first embodiment is applied. In the figure, a degauss coil 1 is attached to the shadow mask (or aperture grille) 5 of a CRT 4. Video signals supplied from the outside are supplied to a video signal processing circuit 6 and deflection processing circuit 7. An output of the video signal processing circuit 6 is supplied to a cathode 51 of the CRT 4 and thereby electron beams to be irradiated to R, G and B fluorescent elements (not shown) are produced. An output of the deflection processing circuit 7 is supplied to a deflecting yoke 8 attached to the CRT 4 to deflect the electron beam to a predetermined position.

A demagnetizing current I is supplied from the demagnetizer 20A to the degauss coil 1 which is attached to the shadow mask 5 to demagnetize the magnetized shadow mask 5. In the demagnetizer 20A, an appropriate time t1 is set by a timer 21 and a start pulse a1 is sent out every time when this time t1 elapses. An output operation of the timer 21 is held by the start pulse a1. The elapse time t1 set by the timer 21 is set considering a period of time from when a demagnetization is carried out once to when the next demagnetization becomes possible, i.e. a time during which the positive characteristic thermistor 3 is cooled down for example.

Figure 2:
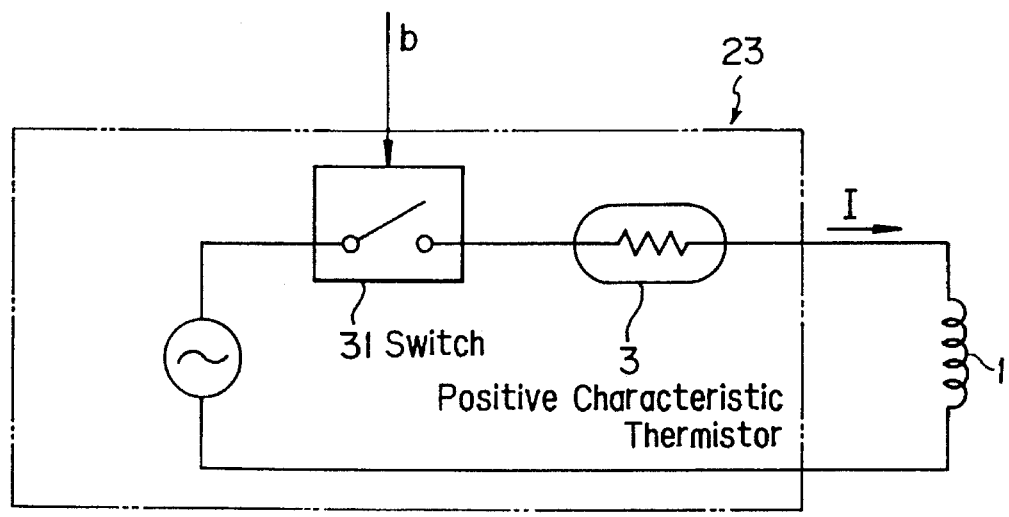
FIG. 2 is a system diagram of a demagnetizing current generating circuit.

The start pulse a1 is supplied to an activating pulse generating circuit 22 and an activating pulse b is sent out from there to a demagnetizing current generating circuit 23. The activating pulse b is generated for about 5 to 10 seconds for example during a time t2 when the shadow mask 5 is completely demagnetized. A demagnetizing current I is supplied from the demagnetizing current generating circuit 23 to the degauss coil 1. The demagnetizing current generating circuit 23 can be constructed by a switch 31 which can be switched by an activating pulse b and a positive characteristic thermistor 3 as shown in FIG. 2. The switch 31 is turned on when the activating pulse b is high and thereby the demagnetizing current I is output.

The activating pulse b is also supplied to a reset pulse generating circuit 24 from which a reset pulse c is supplied to the timer 21. When the timer 21 receives the reset pulse c, an elapsed time counting operation is reset. Then a counting of the predetermined time t1 set is started.

Figure 3:
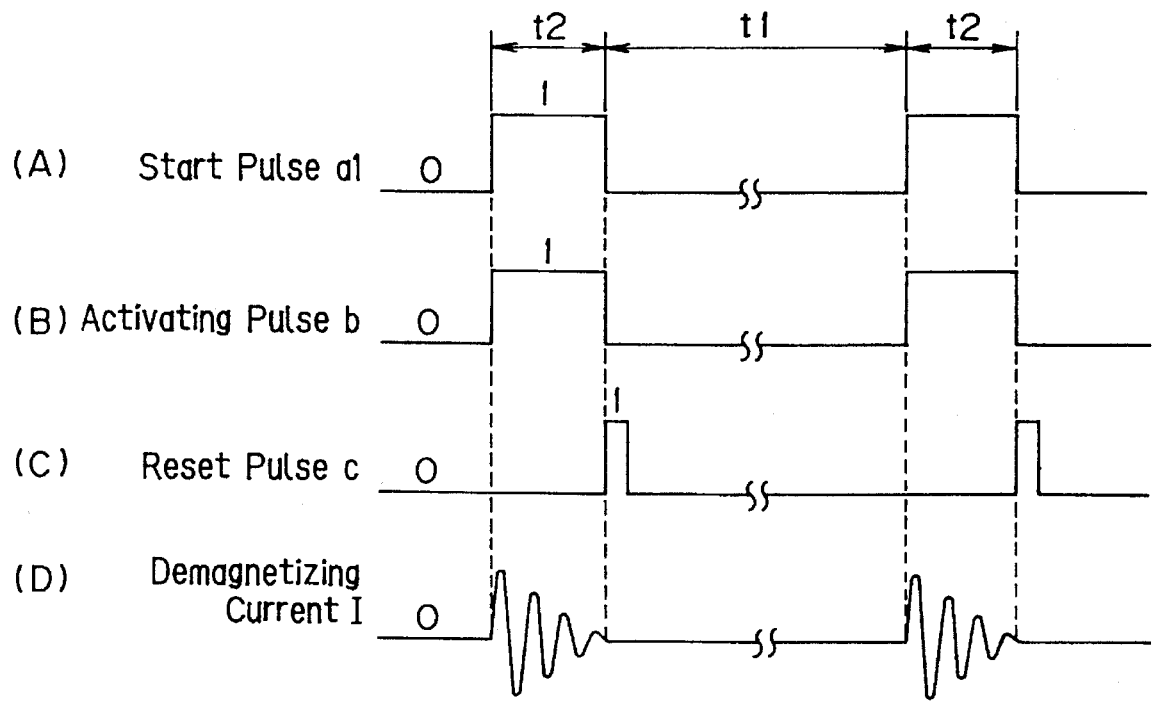
FIG. 3 is a chart of signal waveforms of the demagnetizer shown in FIG. 1.

FIG. 3 shows signal waveforms of the demagnetizer 20A. When the predetermined time t1 elapses from when the TV monitor 10 has been turned on, a start pulse a1 as shown in FIG. 3A is sent out from the timer 21. Receiving that, the activating pulse generating circuit 22 sends out the activating pulse b shown in FIG. 3B. Thereby the demagnetizing current I is supplied to the degauss coil 1 to carry out the demagnetization.

When the activating pulse b turns low, the reset pulse c shown in FIG. 3C is sent out from the reset pulse generating circuit 24, thereby turning the start pulse a1 low. The demagnetizing current I is then stopped and the demagnetizing action is finished.

As described above, because the demagnetization of the shadow mask 5 is automatically carried out in every predetermined time t1 by the demagnetizer 20A of the first embodiment, a quality of the picture can be improved even when it is degraded due to magnetization, without bothering the user.

Figure 4:
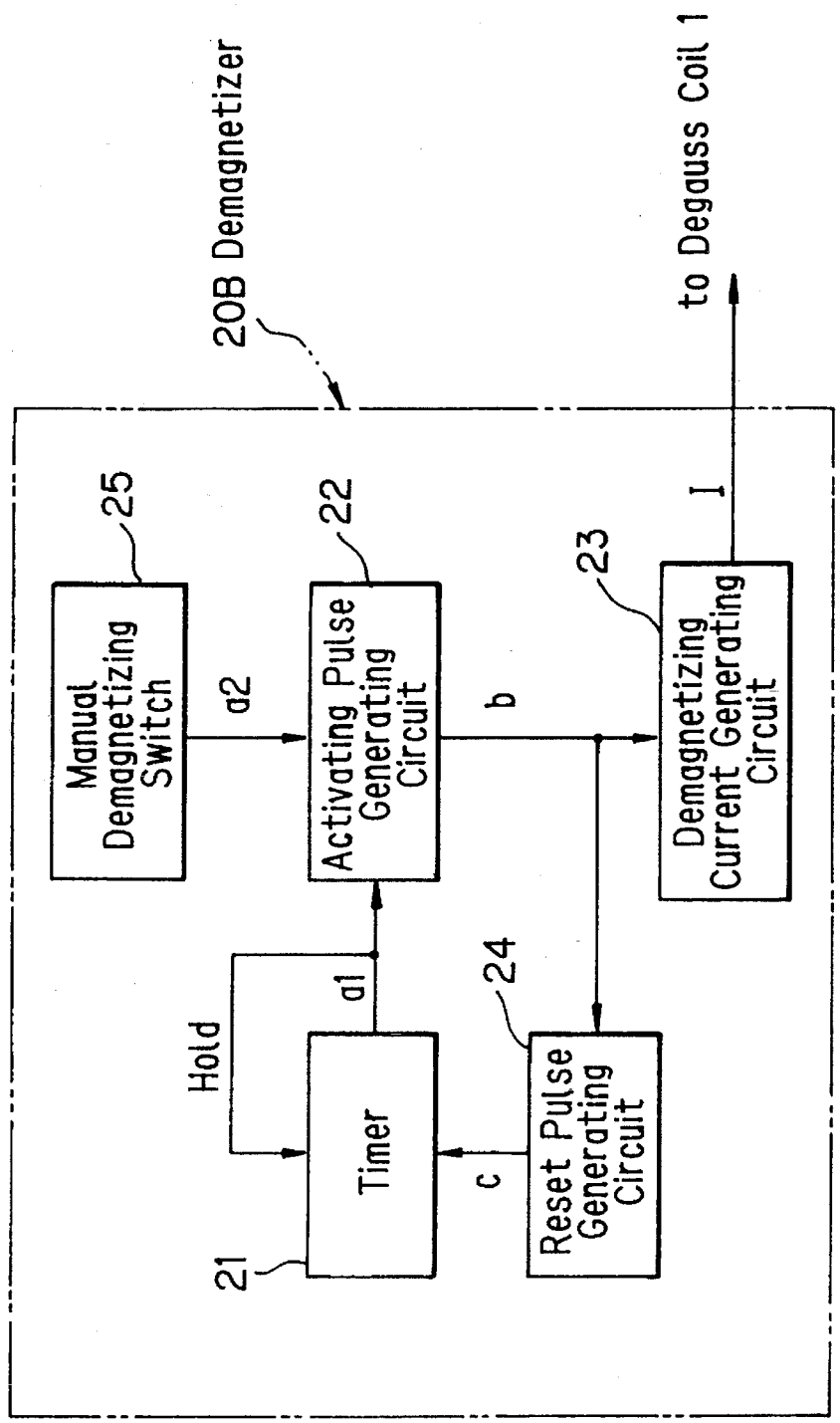
FIG. 4 is a system diagram of a demagnetizer of a second embodiment.

FIG. 4 shows a system of the demagnetizer 20B for display unit of a second embodiment. This demagnetizer 20B can be also applied to the TV monitor 10 in the same manner with the demagnetizer 20A described above. In the figure, since the timer 21, activating pulse generating circuit 22, demagnetizing current generating circuit 23 and reset pulse generating circuit 24 function similarly to those shown in FIG. 1, their detailed explanation will be omitted here.

In this embodiment, however, a manual demagnetizing switch 25 is connected to the activating pulse generating circuit 22. When the manual demagnetizing switch 25 is pressed, a start pulse a2 is sent out to control the activating pulse generating circuit 22 so as to generate the activating pulse b. The activating pulse b activates the demagnetizing current generating circuit 23 to sent out the demagnetizing current I to be supplied to the degauss coil 1 in the TV monitor 10.

Figure 5:
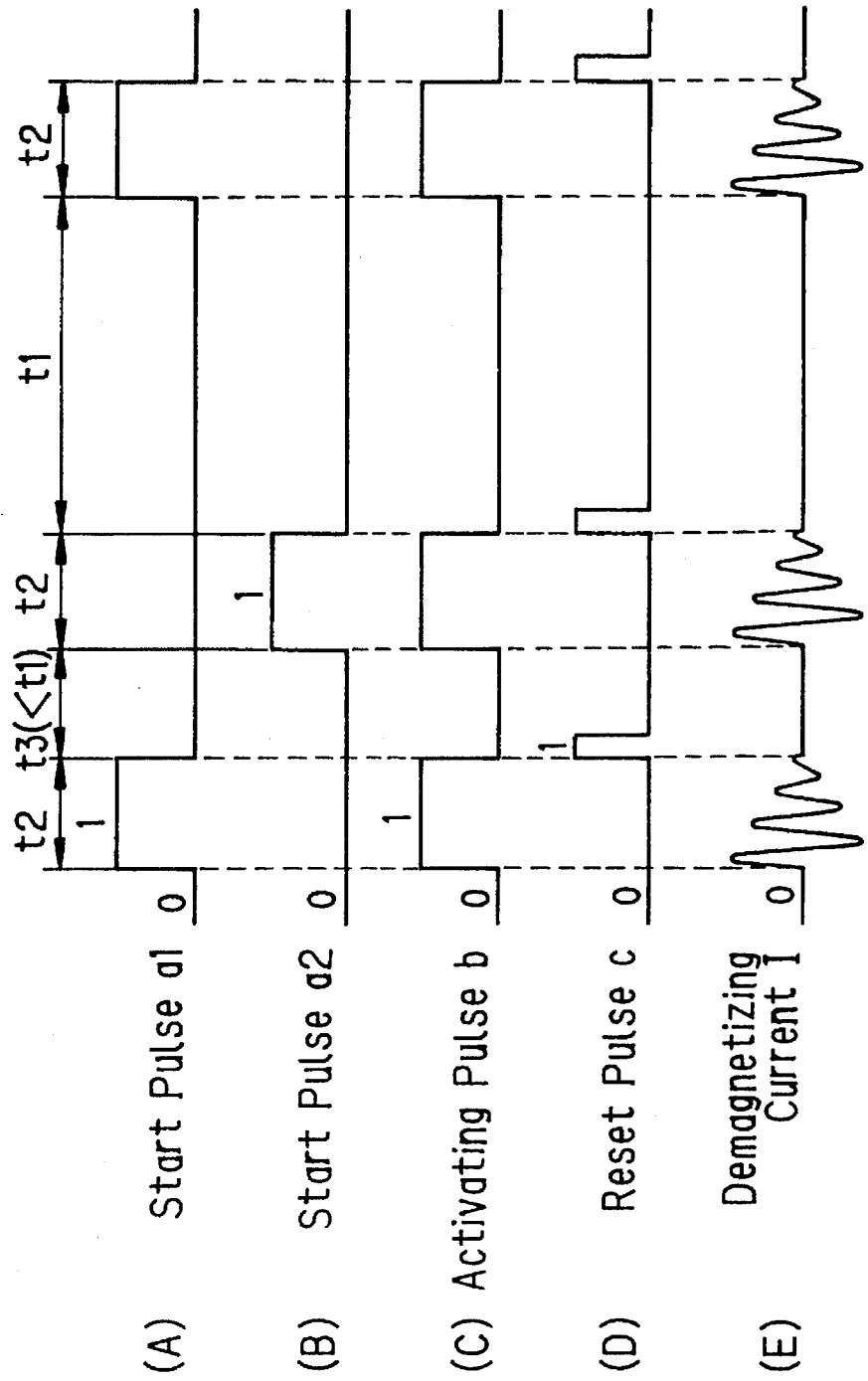
FIG. 5 is a chart of signal waveforms of the demagnetizer shown in FIG. 4.

FIG. 5 shows signal waveforms of the demagnetizer 20B. As the predetermined time t1 elapses from when the TV monitor 10 has been turn on, the start pulse a1 shown in FIG. 5A is supplied from the timer 21 to the activating pulse generating circuit 22. It causes the activating pulse b shown in FIG. 5C to be generated which is supplied to the demagnetizing current generating circuit 23 to generate the demagnetizing current I shown in FIG. 5D.

The activating pulse b is also supplied to the reset pulse generating circuit 24 and as a predetermined time t2 elapses, the reset pulse c shown in FIG. 5D is supplied to the timer 21. It turns the start pulse a1 low, stopping the demagnetizing action. Then when the manual demagnetizing switch 25 is pressed when a time t3 which is shorter than the predetermined time t1 set in the timer 21 elapsed, the start pulse a2 shown in FIG. 5B is supplied to the activating pulse generating circuit 22. Thereby the activating pulse b is generated and the demagnetizing current I is supplied to the degauss coil 1.

That is, it becomes possible to carry out the demagnetizing action any time by pressing the manual demagnetizing switch 25 in the time t3 which is shorter than the predetermined time t1 set in the timer 21. Then after carrying out the demagnetizing action manually as described above, the timer 21 is reset by the reset pulse c shown in FIG. 5D and a demagnetizing action is carried out automatically as the predetermined time t1 set by the timer 21 elapses.

Figure 6:
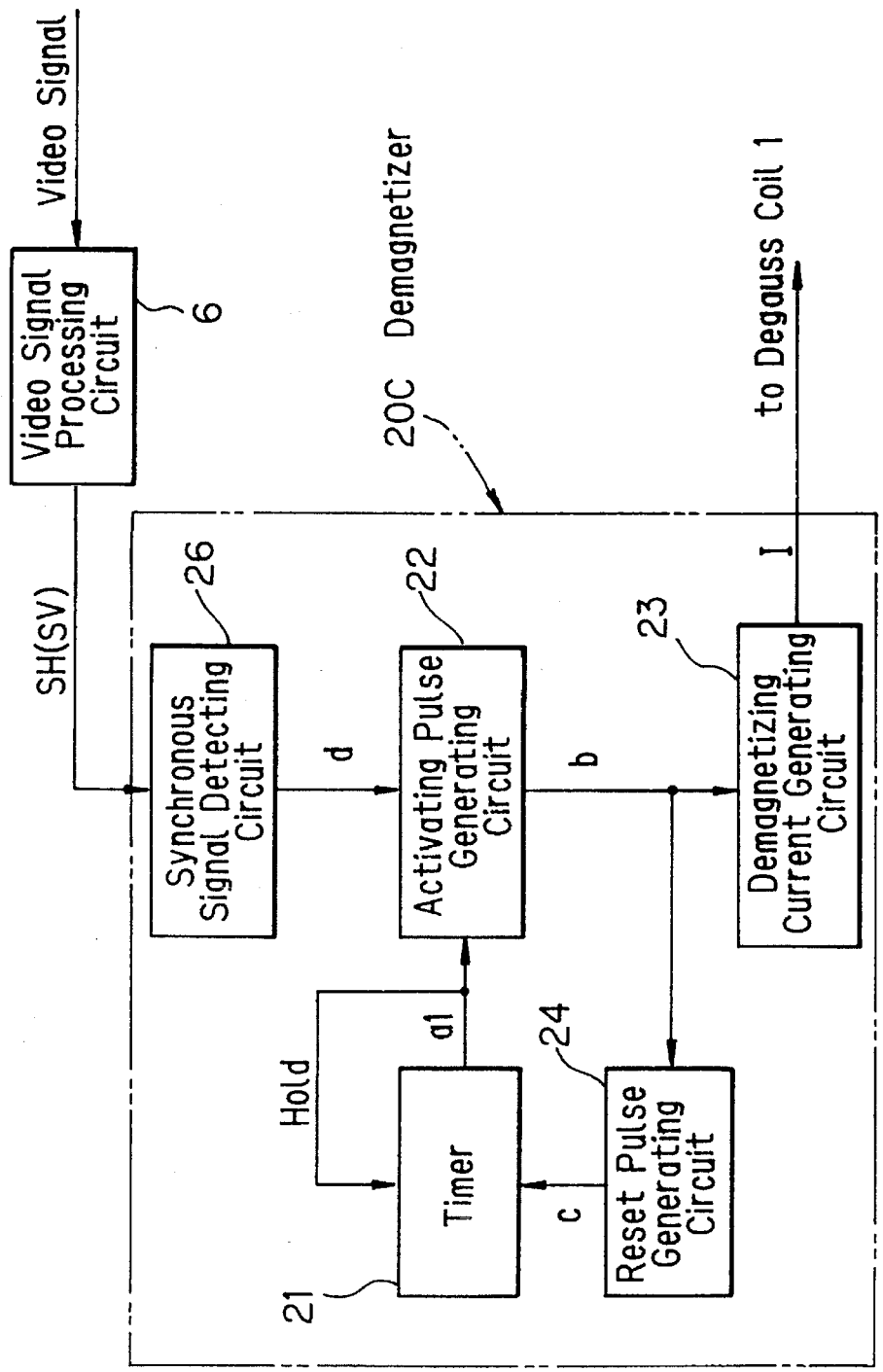
FIG. 6 is a system diagram of a demagnetizer of a third embodiment.

FIG. 6 shows a system of a demagnetizer 20C of a third embodiment. This demagnetizer 20C is what a synchronous signal detecting circuit 26 is added to the demagnetizer 20A of the first embodiment. The synchronous signal detecting circuit 26 is connected to the activating pulse generating circuit 22. When a horizontal synchronous signal SH or vertical synchronous signal SV is supplied from the video signal processing circuit 6 of the TV monitor 10, the synchronous signal detecting circuit 26 detects it and generates a stop pulse d.

The stop pulse d is supplied to the activating pulse generating circuit 22 to stop it and to stop generating the activating pulse b. Accordingly, the demagnetizing action will not be carried out during when the video signal is being input.

Figure 7:
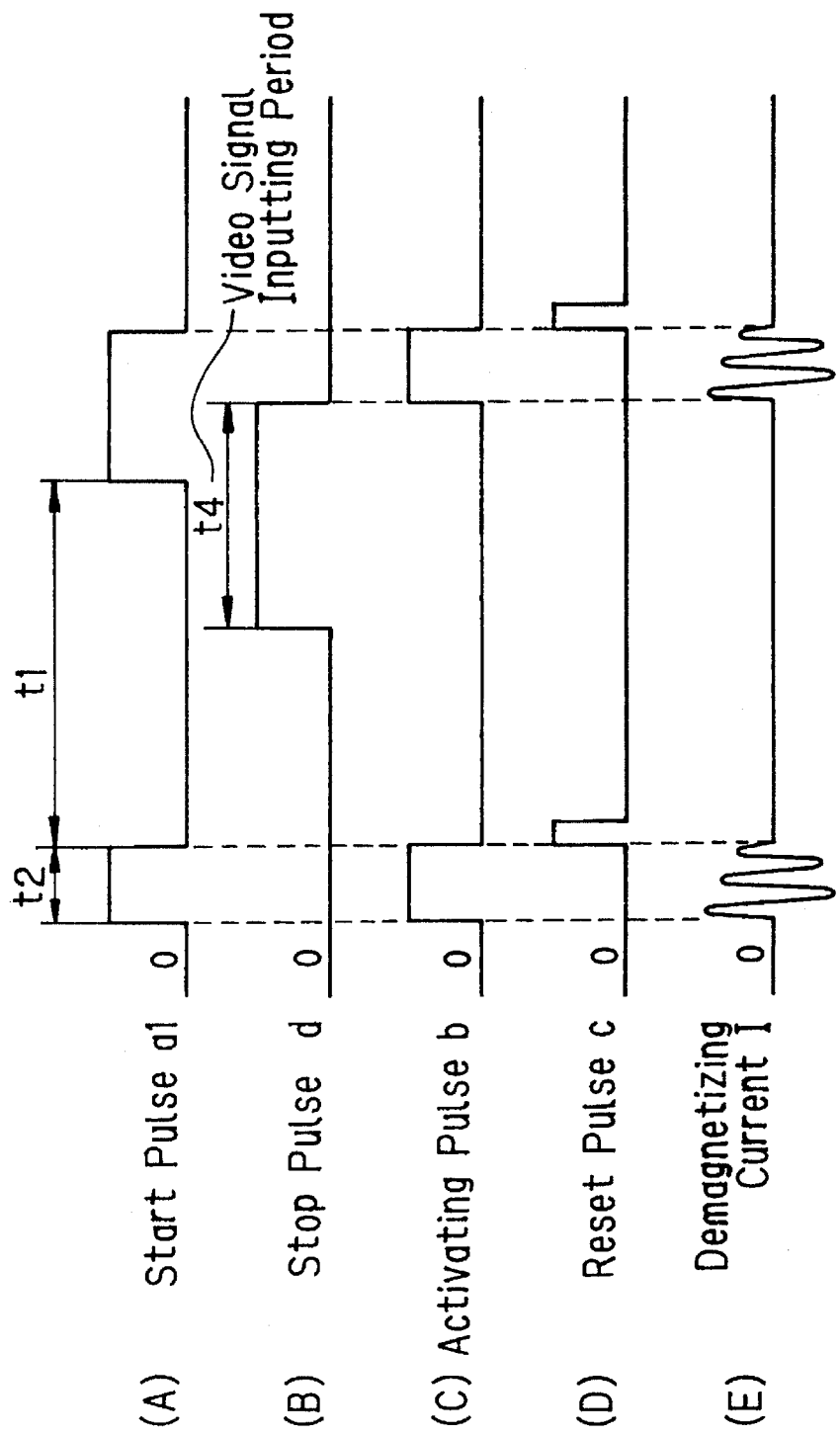
FIG. 7 is a chart of signal waveforms of the demagnetizer shown in FIG. 6.

FIG. 7 shows signal waveforms of the demagnetizer 20C. When the video signal is input after carrying out the demagnetizing action and before the predetermined time t1 set in the timer 21 elapses for example, the stop pulse d shown in FIG. 7B is sent out from the synchronous signal detecting circuit 26 to the activating pulse generating circuit 22. Even if the predetermined time t1 elapses during a period t4 in which the stop pulse d is high and the start pulse a1 shown in FIG. 7A is sent out from the timer 21, the activating pulse generating circuit 22 is not activated and hence no magnetizing action is carried out.

Further, at this time, because the reset pulse c is not generated even if the predetermined time t2 has elapsed since the generation of the start pulse a1, the start pulse a1 is still sent out continuously from the timer 21. Then when the input of the video signal ends, the stop pulse d turns low. Because the start pulse a1 is being supplied to the activating pulse generating circuit 22 at this time, it activates the activating pulse generating circuit 22.

Thereby the demagnetizing current I is generated from the demagnetizing current generating circuit 23 to carry out the demagnetizing action. Further, when the activating pulse b turns low, the reset pulse c is generated to reset the timer 21. Because no demagnetizing action is carried out even if the predetermined time t1 set by the timer 21 elapses when the video signal is input to the TV monitor 10 in this demagnetizer 20C, it becomes possible to prevent the screen from being disturbed by the demagnetizing action carried out while watching the picture.

Although the synchronous signal detecting circuit 26 has been used for detecting the video signal in the demagnetizer 20C described above, any circuit capable of detecting that the video signal has been input may be used instead of that.

Figure 8:
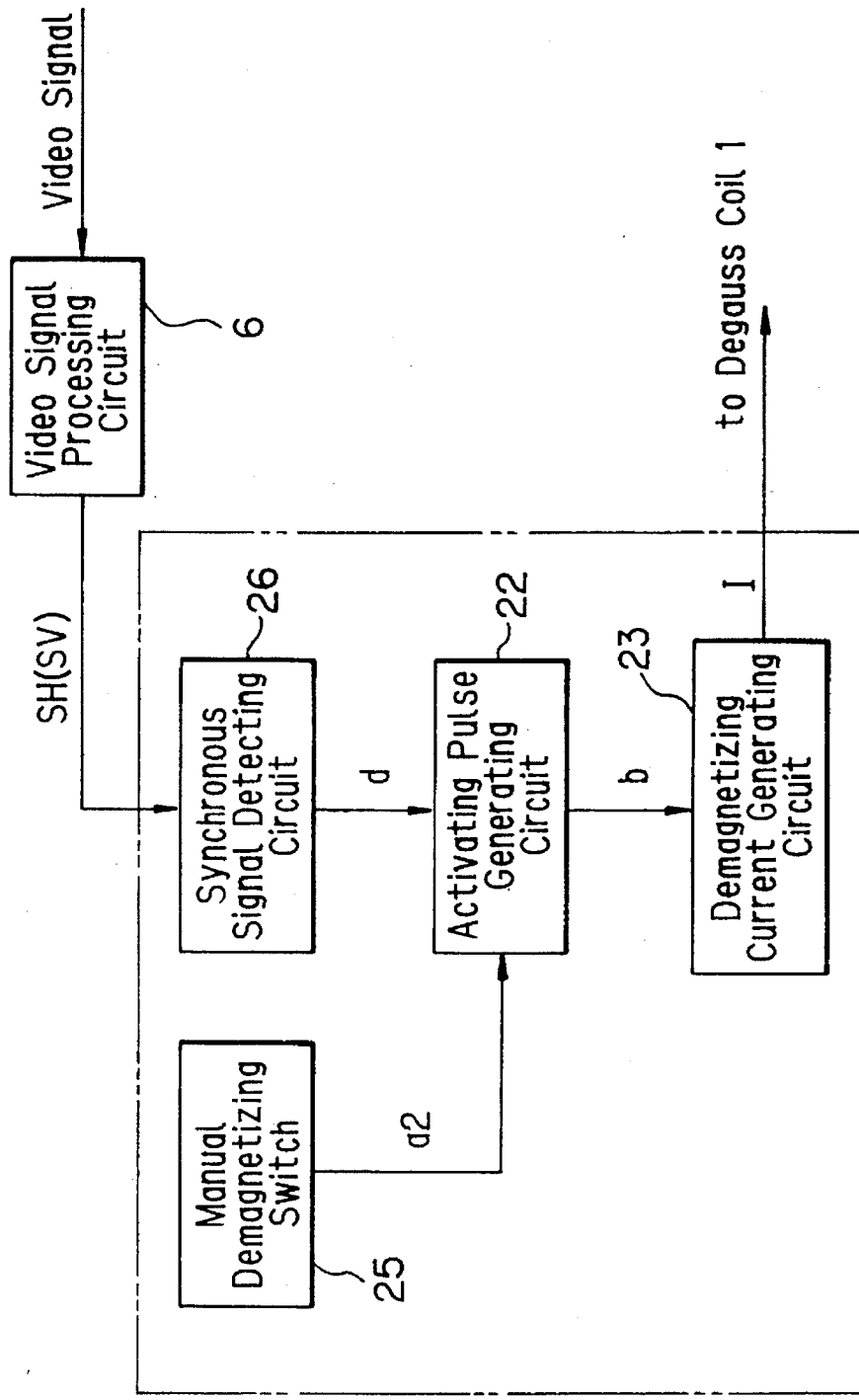
FIG. 8 is a system diagram of a demagnetizer of a fourth embodiment.

FIG. 8 shows a system of a demagnetizer 20D of a fourth embodiment. This demagnetizer 20D is what the timer 21 and reset pulse generating circuit 24 are removed from and the manual demagnetizing switch 25 and synchronous signal detecting circuit 26 are added to the demagnetizer 20A of the first embodiment. Since the detail of each component is the same with what described above, the explanation thereof will be omitted here.

Figure 9:
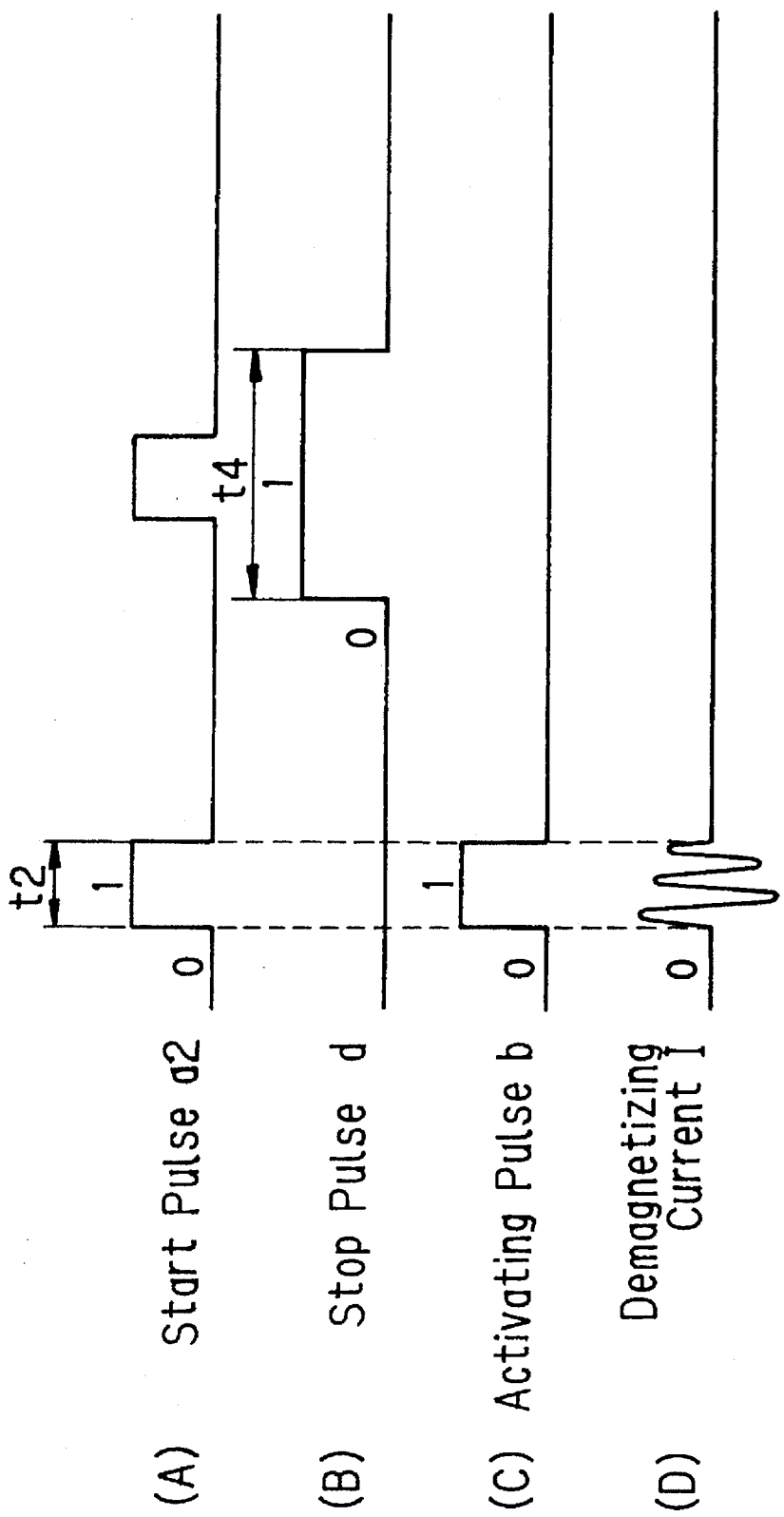
FIG. 9 is a chart of signal waveforms of the demagnetizer shown in FIG. 8.

FIG. 9 shows signal waveforms of the demagnetizer 20D. As shown in FIG. 9B, the stop pulse d is sent out from the synchronous signal detecting circuit 26 and the activating pulse generating circuit 22 is stopped during the period t4 when the video signal is input. Accordingly, the activating pulse b is not generated even if the manual demagnetizing switch 25 is pressed and if the start pulse a2 shown in FIG. 9A is supplied to the activating pulse generating circuit 22 during this period t4.

That is, because no demagnetizing action is carried out even if the manual demagnetizing switch 25 is pressed during when the video signal is input, it is possible to prevent the screen from being disturbed by the demagnetizing action carried out while watching the picture.

Figure 10:
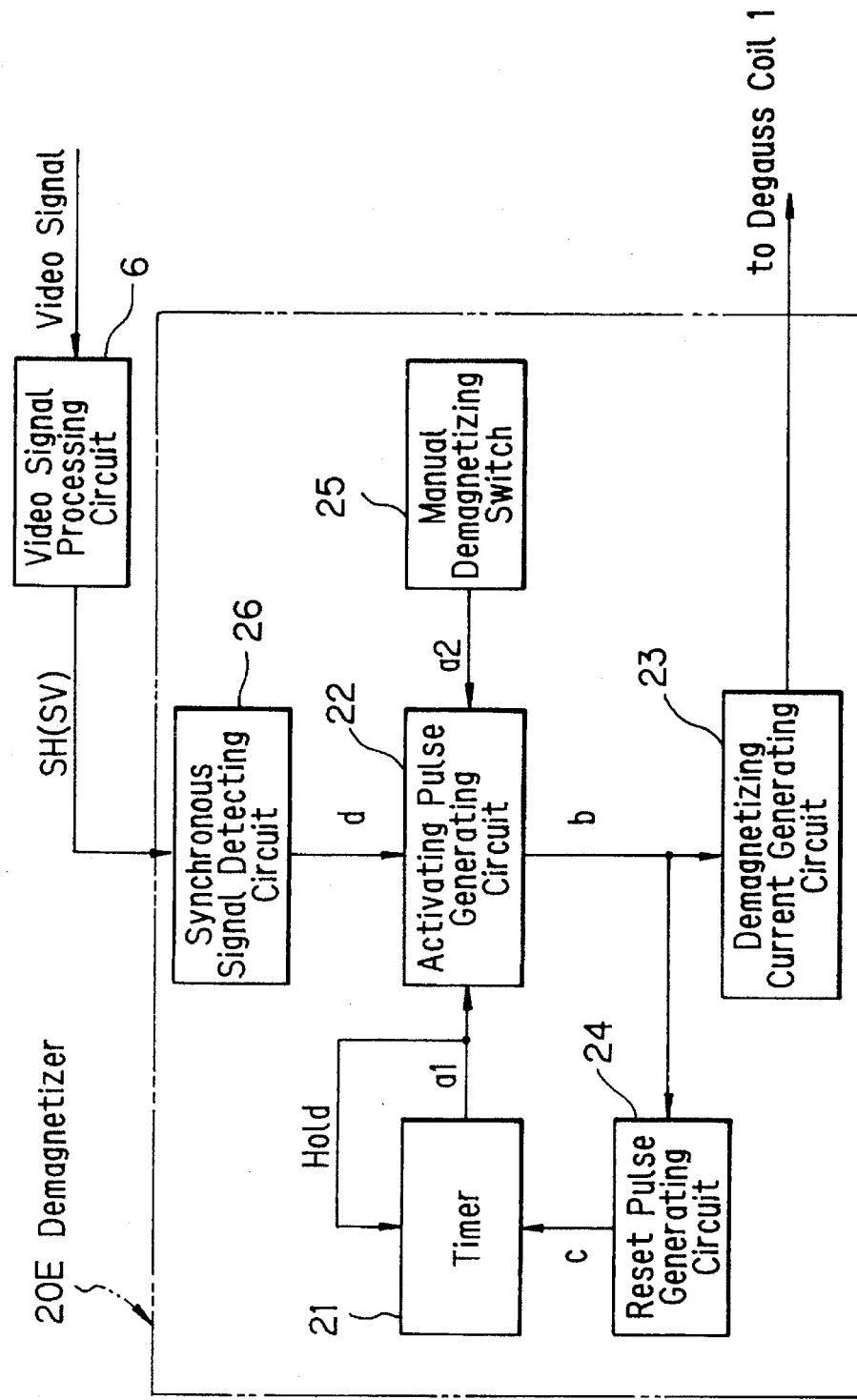
FIG. 10 is a system diagram of a demagnetizer of a fifth embodiment.

FIG. 10 shows a system of a demagnetizer 20E of a fifth embodiment. This demagnetizer 20E is what the manual demagnetizing switch 25 and synchronous signal detecting circuit 26 are added to the demagnetizer 20A of the first embodiment, and the detail of each component thereof are the same with those described above.

Figure 11:
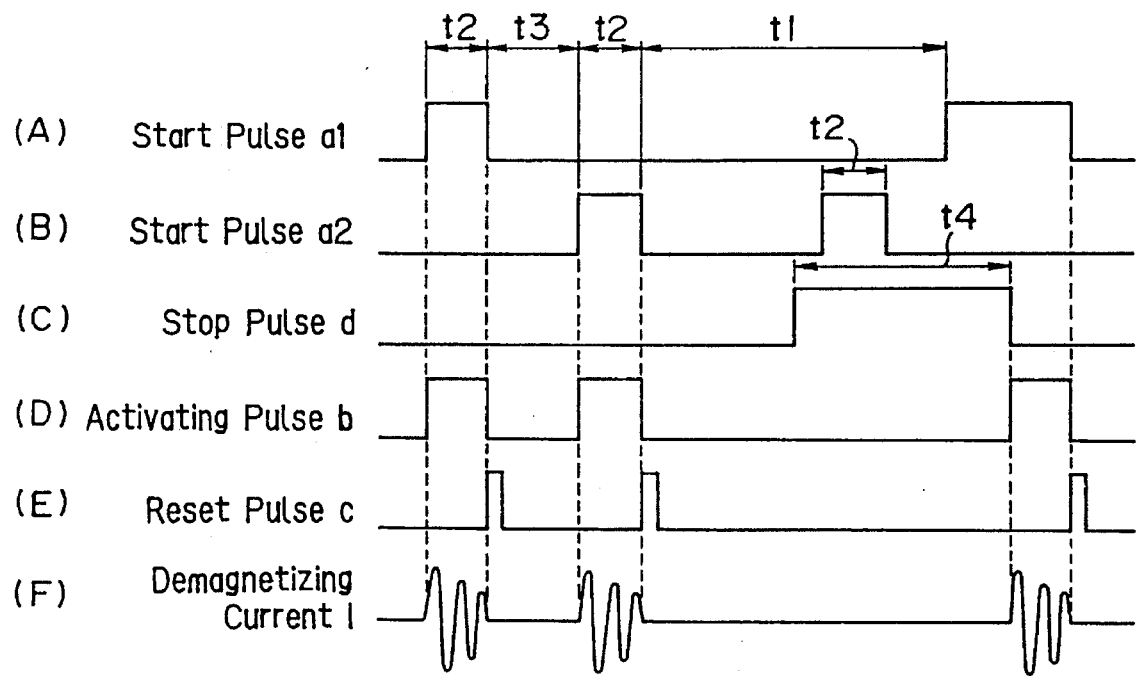
FIG. 11 is a chart of signal waveforms of the demagnetizer shown in FIG. 10.
Figure 12:
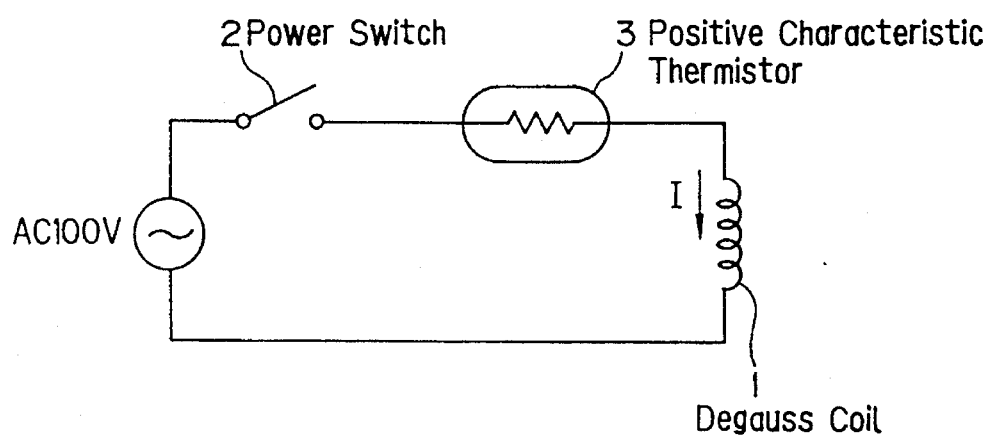
FIG. 12 is a system diagram of a related art demagnetizer.

FIG. 11 shows signal waveforms of the demagnetizer 20E. The start pulse a1 shown in FIG. 11A is generated in every predetermined time t1 set by the timer 21. Thereby the activating pulse b is supplied from the activating pulse generating circuit 22 to the demagnetizing current generating circuit 23 to generate the demagnetizing current I and to carry out the demagnetizing action.

When the manual demagnetizing switch 25 is pressed before the predetermined time t1 elapses, the start pulse a2 shown in FIG. 11B is supplied to the activating pulse generating circuit 22 and thereby the activating pulse b is supplied to the demagnetizing current generating circuit 23 to carry out the demagnetizing action. When the activating pulse b is generated by the start pulses a1 and a2, the reset pulse c shown in FIG. 11E is generated from the reset pulse generating circuit 24 to reset the timer 21.

When the video signal is being input, the synchronous signal detecting circuit 26 detects it and supplies the stop pulse d shown in FIG. 11C to the activating pulse generating circuit 22 to stop generating the activating pulse b. Accordingly, the activating pulse b is not generated and hence no demagnetizing action is carried out even if the manual demagnetizing switch 25 is pressed and if the start pulse a2 is generated during the period t4 in which the stop pulse d is generated. At this time, the start pulse a2 is not self-held and turns low after the predetermined time t2 elapses.

Because the activating pulse b is not generated also when the start pulse a1 is sent out from the timer 21 during the period t4 when the stop pulse d is generated, no demagnetizing action is carried out. However, at this time, the start pulse a1 is self-held and is sent out even after when the predetermined time t2 elapsed. Then when the input of the video signal ends and the stop pulse d turns low, the activating pulse b is sent out from the activating pulse generating circuit 22 to carry out the demagnetizing action.

The demagnetizing action is carried out automatically in every predetermined time t1 set by the timer 21 in this demagnetizer 20E. Further, the demagnetizing action can be carried out any time by pressing the manual demagnetizing switch 25. Furthermore, because no demagnetizing action is carried out while watching the picture, the screen may be prevented from being disturbed.

While preferred embodiments of the present invention have been described, variations thereto will occur to those skilled in the art within the scope of the present inventive concepts which are delineated by the following claims.

What is claimed is:

1. A demagnetizer for display unit having a cathode-ray tube, comprising:

a degauss coil for demagnetizing a magnetized shadow mask or aperture grille of the cathode-ray tube, demagnetizing current generating means for supplying a demagnetizing current to said degauss coil, activating pulse generating means for generating an activating pulse for activating said demagnetizing current generating means, video signal detecting means for detecting video signals supplied to said display unit and for generating a stop pulse for stopping said activating pulse generating means when the video signals are supplied, a timer for setting intervals for generating said activating pulse, and timer reset means for resetting said timer when said activating pulse is generated.

2. The demagnetizer for display unit according to claim 1 further comprising switch means for activating said activating pulse generating means.

3. A demagnetizer for display unit having a cathode-ray tube, comprising:

a degauss coil for demagnetizing a magnetized shadow mask or aperture grille of the cathode-ray tube, demagnetizing current generating means for supplying a demagnetizing current to said degauss coil, activating pulse generating means for generating an activating pulse for activating said demagnetizing current generating means, a switch for activating said activating pulse generating means, and video signal detecting means for detecting video signals supplied to said display unit and for generating a stop pulse for stopping said activating pulse generating means when the video signals are supplied.

4. A display unit comprising:

a cathode-ray tube provided with a deflecting coil, a degauss coil for demagnetizing a magnetized shadow mask or aperture grille of the cathode-ray tube, demagnetizing current generating means for supplying a demagnetizing current to said degauss coil, activating pulse generating means for generating an activating pulse for activating said demagnetizing current generating means, video signal detecting means for detecting video signals supplied to said display unit and for generating a stop pulse for stopping said activating pulse generating means when the video signals are supplied, a timer for sating intervals for generating said activating pulse, and a timer reset means for resetting said timer when said activating pulse is generated.

5. The display unit according to claim 4 further comprising switch means for activating said activating pulse generating means.

6. A display unit comprising:

a CRT provided with a deflecting coil, a degauss coil for demagnetizing a magnetized shadow mask or aperture grille of the CRT, demagnetizing current generating means for supplying a demagnetizing current to said degauss coil, activating pulse generating means for generating an activating pulse for activating said demagnetizing current generating means, a switch for activating said activating pulse generating means, and video signal detecting means for detecting video signals supplied to said display unit and for generating a stop pulse for stopping said activating pulse generating means when the video signals are supplied.

* * * * *